G. M. EATON.
ELECTRIC LOCOMOTIVE.
APPLICATION FILED JAN. 4, 1916.

1,271,682.

Patented July 9, 1918.

WITNESSES:
Fred. A. Lind
W. B. Wells

INVENTOR
George M. Eaton
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,271,682.
Specification of Letters Patent.
Patented July 9, 1918.

Application filed January 4, 1916. Serial No. 70,245.

*To all whom it may concern:*

Be it known that I, GEORGE M. EATON, a citizen of the United States, and a resident of Pittsburgh, in the county of Allegheny and State of Pennsylvania, have invented a new and useful Improvement in Electric Locomotives, of which the following is a specification.

My invention relates to locomotives and particularly to the disposition and to the construction of the trucks for electric locomotives.

One object of my invention is to provide a locomotive with trucks which are disposed relative to one another and are joined to the cab of the locomotive to insure good tracking and running qualities in the locomotive.

More specifically, the object of my invention is to provide a locomotive with three articulated four-wheel driving trucks and two two-wheel guiding trucks. Two of the four-wheel trucks are pivotally joined to the cab of the locomotive and, disposed between the two trucks and joined thereto, is the third four-wheel truck which is a floating truck. The two two-wheel trucks are joined to the free ends of the two four-wheel trucks which are pivotally joined to the cab.

Figure 1:
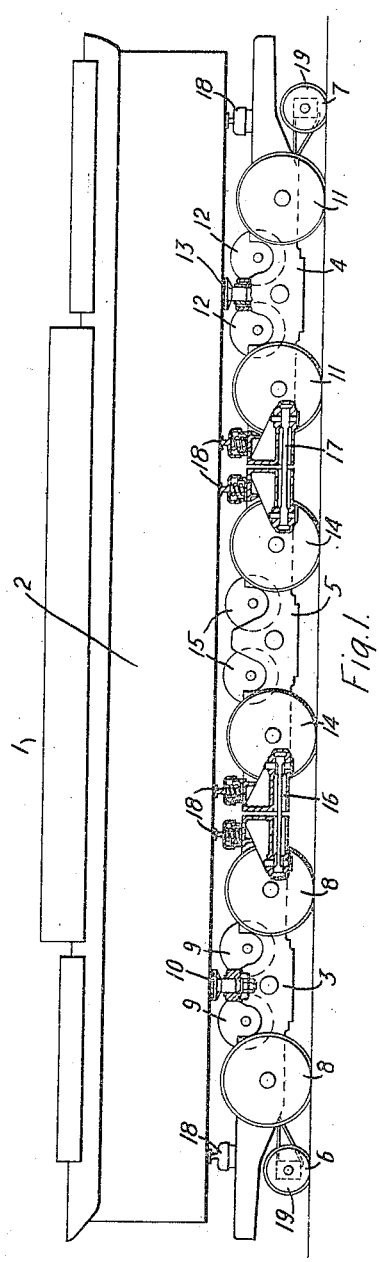
Figure 2:
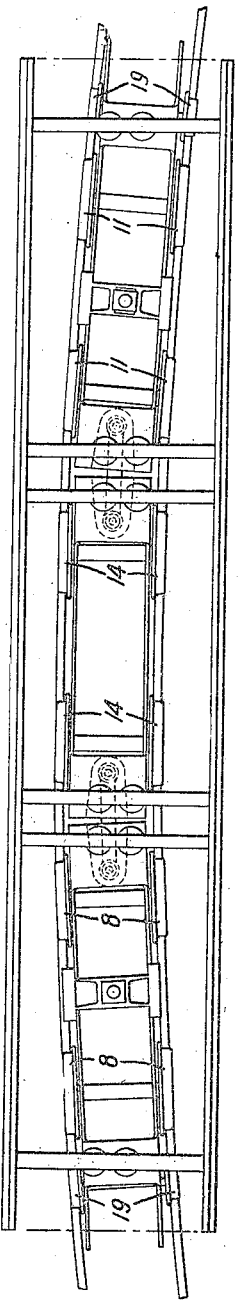

In the accompanying drawing, Figure 1 is a side elevation of a locomotive constructed in accordance with my invention, and Fig. 2 is a diagrammatic plan view thereof.

Referring to the drawing, an electric locomotive 1 is provided with a cab 2, two four-wheel outer trucks 3 and 4, a four-wheel inner truck 5 disposed between the trucks 3 and 4, and two two-wheel guiding trucks 6 and 7.

The truck 3 comprises four driving wheels 8 and two motors 9. A pivotal connection 10 is provided between the cab 2 and the truck 3 which will permit the truck to have only rotary motion in a horizontal plane relative to the cab. The truck 4 is provided with driving wheels 11 and two motors 12 which are geared to the driving wheels. A pivotal connection 13 is provided between the truck 4 and the cab which will not only permit the truck to have rotary motion relative to the cab but will permit the same to have a small longitudinal movement in a horizontal plane. In order to permit the relative longitudinal movement between the cab and the truck 4, the bearing for the king pin of the pivotal connection 13 is provided with an elongated opening, as illustrated in Figs. 1 and 2 of the drawing. The floating truck 5 comprises four driving wheels 14 which are operated by two driving motors 15 and is practically unrestrained by the cab 2 from any movement in a horizontal plane relative to the cab. The trucks 3 and 5 are pivotally connected by a link 16, and the trucks 4 and 5 are pivotally connected by a link 17 in order that there may be a minimum degree of lost motion between the three trucks 3, 4 and 5. Spring friction bearings 18 are provided for supporting the cab 2 on the trucks 3, 4 and 5.

The guiding trucks 6 and 7 are joined to the trucks 3 and 4, respectively, and each of the same comprises wheels 19, preferably of a lesser diameter than the diameter of the driving wheels on the trucks 3, 4 and 5.

In operating the locomotive, the guiding trucks 6 and 7 are adapted principally for guiding the locomotive to insure good tracking qualities. The driving trucks 3, 4 and 5 are joined together and to the cab in such manner that they may readily adjust them- selves to any track curve that may be encountered. As has been set forth, the truck 3 may have only rotary motion in a horizontal plane relative to the cab; the truck 5 is unrestrained from any movement in a horizontal plane relative to the cab, and the truck 4 may have, not only rotary motion relative to the cab, but also a small longitudinal movement. It should be noted that, because of the connecting links 16 and 17 between the trucks 3, 4 and 5 and the pivotal connection 10 between the cab 2 and the truck 3, there will be a practical absence of lost motion in operating the locomotive.

Various modifications in the apparatus and improvements in the operation thereof may be effected without departing from the spirit and scope of my invention and, I desire, therefore, that only such limitations shall be imposed as are indicated in the appended claims.

I claim as my invention:

1. In a locomotive, the combination with a cab, of three articulated driving trucks, friction bearings between each of said trucks and the cab, and means for pivotally connecting the two end trucks to said cab, one of said pivotal connections being provided with means for permitting the truck carrying it to move longitudinally of, and relatively to, the cab.

2. In a locomotive, the combination with a cab, of three articulated trucks, one of said trucks being a floating truck and two of said trucks being joined to said cab, and means comprising friction bearings for supporting a portion of the cab weight on each of said trucks.

3. In a locomotive, the combination with a cab, a four-wheel floating inner truck, two four-wheel outer trucks, and two-wheel guiding trucks joined to said outer trucks.

4. In a locomotive, the combination with a cab, of a floating inner truck, two outer trucks pivotally joined to said cab, and friction bearings for supporting said cab upon the inner and the two outer trucks.

5. In a locomotive, the combination with a cab, of a floating inner truck, two outer trucks pivotally joined to said cab, friction bearings for supporting said cab upon the inner and the two outer trucks, and two two-wheel guiding trucks joined to said outer trucks.

6. In a locomotive, the combination with a cab, of a floating inner truck, two outer trucks pivotally joined to said cab, driving motors mounted upon said inner and outer trucks, and guiding trucks joined to said outer trucks.

7. In a locomotive, the combination with a cab, of an outer truck pivotally joined near to one end of said cab, an outer truck pivotally joined near to the opposite end of said cab so as to have a small longitudinal movement relative to the cab, and a floating inner truck disposed between the two outer trucks and joined thereto.

8. In a locomotive, the combination with a cab, of three articulated four-wheel trucks, pivotal connections between two of said trucks and the cab, friction bearings between each of said trucks and the cab, and two two-wheel guiding trucks joined to said four-wheel trucks.

9. In a locomotive, the combination with a cab, of three articulated trucks, one of said trucks being pivotally joined to said cab, a second one of said trucks being unrestrained by said cab from relative movement in a horizontal plane, and the third one of said trucks being pivotally joined to said cab, whereby the cab and the third truck may have a longitudinal movement relative to each other in a horizontal plane.

10. In a locomotive, the combination with a cab, of a four-wheel truck pivotally joined to said cab to have only rotative movement relative to the cab in a horizontal plane, a two-wheel truck joined to one end of said truck, a four-wheel floating truck joined to the opposite end of the first mentioned truck, a third four-wheel truck joined to said floating truck and pivotally joined to said cab to have a small horizontal as well as rotative movement in a horizontal plane relative to the cab, and a two-wheel truck joined to one end of said third four-wheel truck.

11. In a locomotive, the combination with a cab, of a floating inner truck, two outer trucks pivotally joined to said cab, and a plurality of driving motors mounted on each of said trucks.

12. In a locomotive, the combination with a cab, of three articulated driving-trucks, friction bearings between each of said trucks and the cab, and a pivot between each end truck and the cab, relative movement of one of said end trucks in a horizontal plane being unrestrained by the cab.

13. In a locomotive, the combination with a cab, of three articulated four-wheel trucks, pivotal connections between two of said trucks and the cab, and friction bearings between each of said trucks and the cab.

In testimony whereof, I have hereunto subscribed my name this 29th day of Dec. 1915.

GEORGE M. EATON.